J. J. UNBEHAUN.
PHOTOGRAPHIC APPARATUS.
APPLICATION FILED AUG. 5, 1912.
1,149,157.
Patented Aug. 3, 1915.
4 SHEETS—SHEET 4.
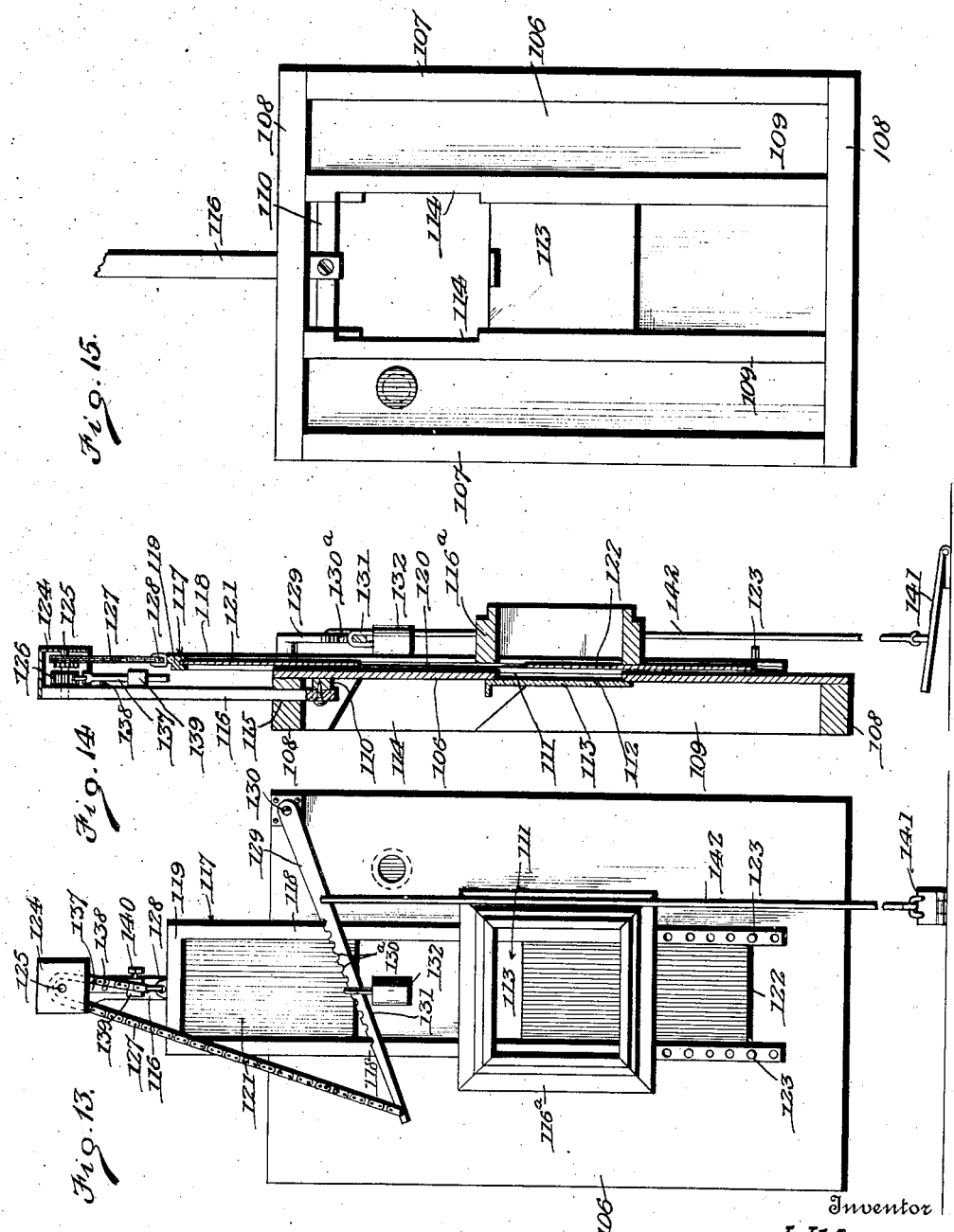
Inventor
J. J. Unbehaun
Attorneys

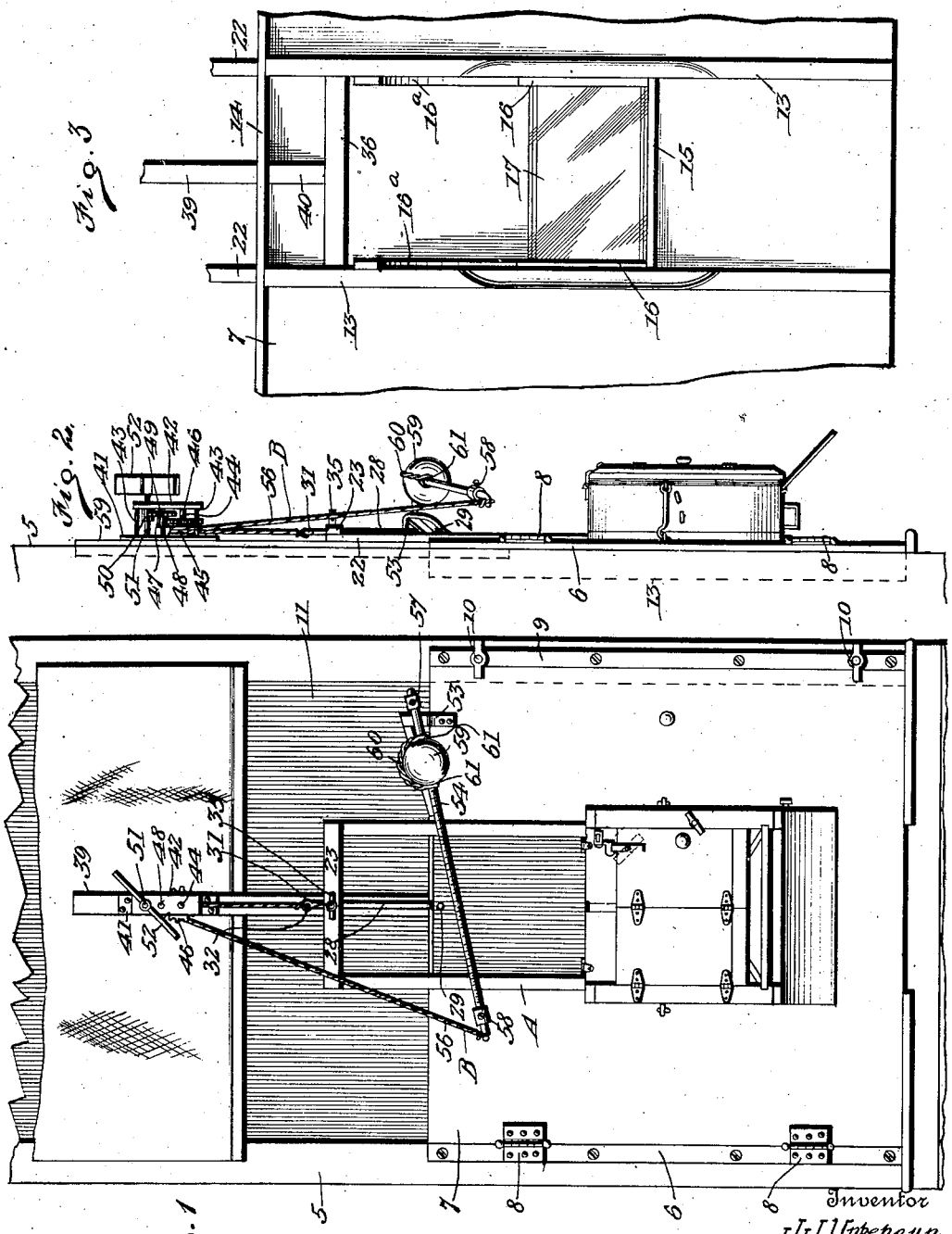

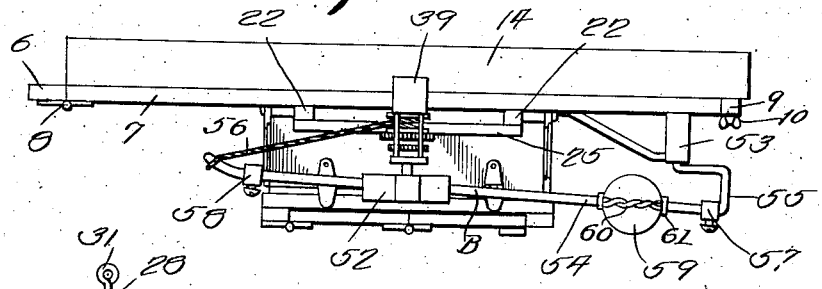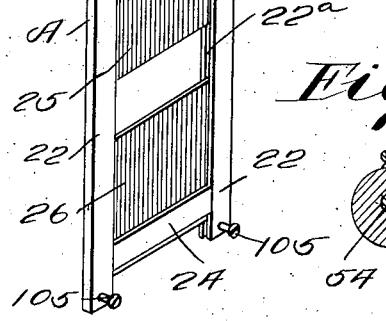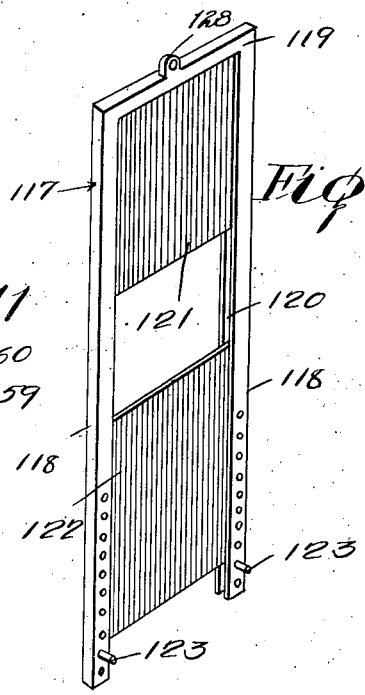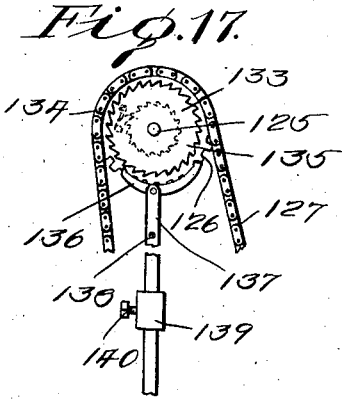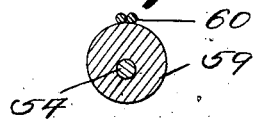

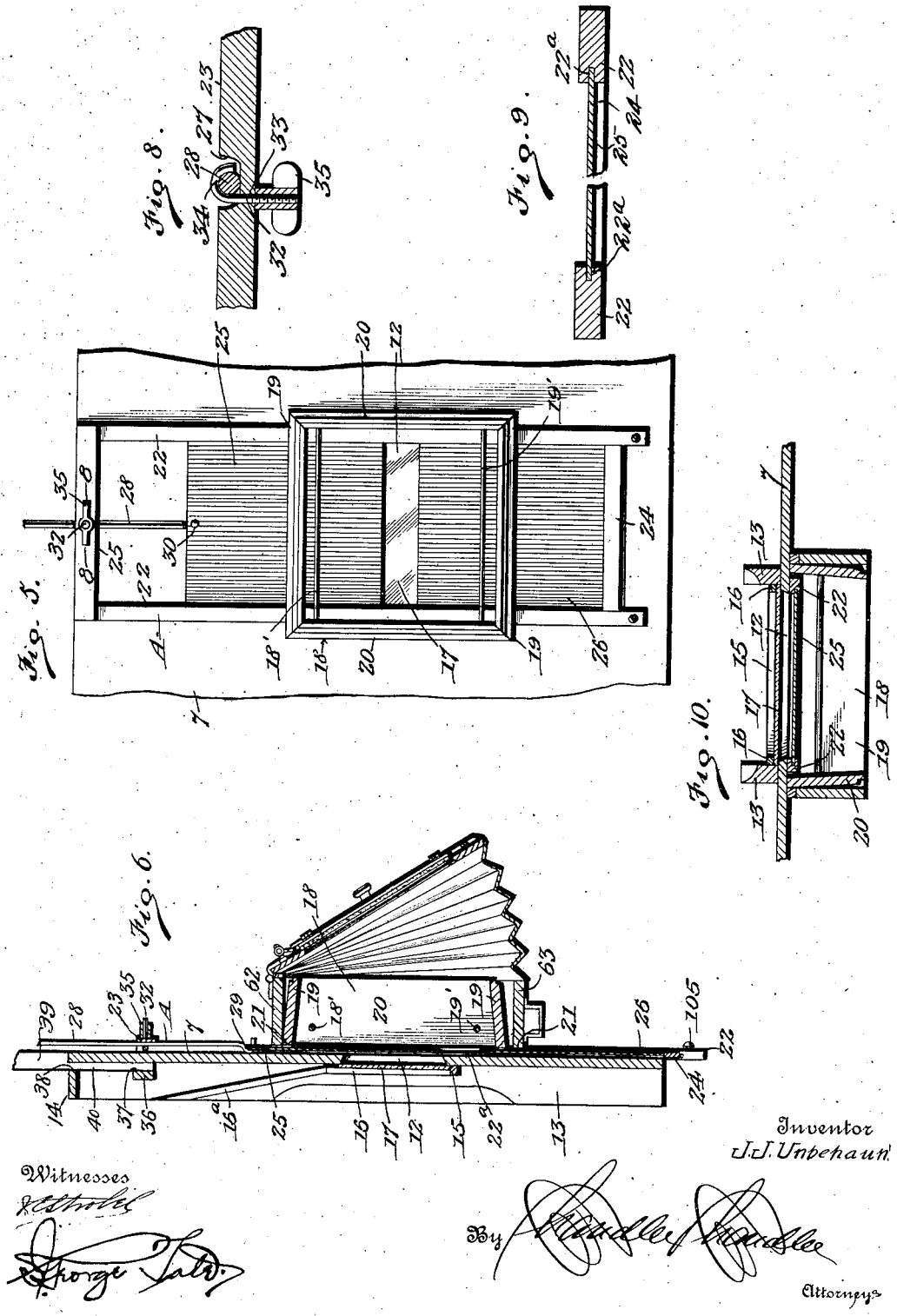

UNITED STATES PATENT OFFICE.

JOHN J. UNBEHAUN, OF DESHLER, NEBRASKA.

PHOTOGRAPHIC APPARATUS.

1,149,157.   Specification of Letters Patent.   Patented Aug. 3, 1915.

Application filed August 5, 1912. Serial No. 713,410.

*To all whom it may concern:*

Be it known that I, JOHN J. UNBEHAUN, a citizen of the United States, residing at Deshler, in the county of Thayer, State of Nebraska, have invented certain new and useful Improvements in Photographic Apparatus; and I do hereby declare the following to be a full, clear, and exact description of the invention, such as will enable others skilled in the art to which it appertains to make and use the same.

This invention relates to improvements in photographic apparatus.

The object of the invention is to provide a gravity-actuated shutter and means for controlling the ascent and descent thereof whereby prints may be respectively made upon said movements of said shutter.

Another object of the invention is to provide a gravity shutter which includes relatively fixed and movable ruby sections adapted to be adjusted to create light openings of different sizes, the size of the opening depending upon the brilliancy of the light employed and upon the length of exposure desired.

With these and other objects in view, the invention consists in the construction and novel combination of parts hereinafter fully described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

In the drawings: Figure 1 is a front view of a window casing showing the application of a photographic apparatus constructed in accordance with my invention, Fig. 2 is a side elevation thereof, Fig. 3 is a detail rear elevation of the back-board, Fig. 4 is a top plan view of the apparatus detached from the window casing, Fig. 5 is a detail front elevation of the back-board showing the light tube and shutter, the printing cabinet being removed, Fig. 6 is an enlarged detail vertical sectional view through the apparatus, Fig. 7 is a perspective view of the shutter, Fig. 8 is a detail sectional view taken on the line 8—8 of Fig. 5, Fig. 9 is a detail cross sectional view through the shutter, Fig. 10 is a detail horizontal sectional view through the apparatus, the supporting board of the printing cabinet being removed, Fig. 11 is a detail cross sectional view through the balance lever and weight, showing the latter in its inoperative position, Fig. 12 is a similar view but showing the weight in its operative position, Fig. 13 is a front elevation showing the modified form of printing apparatus, Fig. 14 is a vertical sectional view therethrough, Fig. 15 is a detail rear elevation thereof, Fig. 16 is a perspective view of the shutter employed in the modified form, Fig. 17 is a detail elevation of the governor mechanism employed in the modified form of my invention.

Like reference numerals designate corresponding parts in all the figures of the drawings.

Referring to the drawings and particularly Fig. 1, 5 designates a window casing, and secured to one side thereof by any suitable means is a vertical strip 6 to which a back-board 7 of any suitable opaque material is connected by hinges 8. The back-board 7 extends across the window, and has its edge opposite the strip 6 bearing against the other side of the casing. Secured to this side of the casing is a vertical strip 9, and this strip carries a plurality of buttons 10 which are engageable with the back-board 7 to retain the same against movement. This back-board is preferably disposed against the lower portion of the casing, and secured to the casing directly above the back-board is a ruby glass 11.

The back-board 7 is centrally formed with a rectangular light opening 12, and secured to the rear face of this board on either side of the opening are spaced vertical guide bars 13—13.

Secured to the upper edge of the board 7 is a rearwardly extending top strip 14, said strip being also connected to the guide bars 13.

Secured to the rear face of the back-board intermediate the guide bars 13 and below the light opening 12, is a transverse supporting strip 15.

Secured to the inner faces of the guide bars 13 are guide strips 16—16, the lower portions of said strips being disposed in spaced relation to the back-board 7 for receiving a ground glass plate 17, said plate being disposed in advance of the light opening 12. The upper ends of the strips 16 incline outwardly, as at 16ª, to permit of said glass being readily inserted in position.

Secured to the inner face of the back-board 7 and disposed around the light opening 12 is a rectangular light tube 18 which includes inwardly converging top and bottom walls 19—19 and side walls 20—20, the inner edges of said walls being rabbeted to support a view camera (not shown).

Formed in the upper and lower walls 19 directly against the back-board 7 are longitudinal slots 21—21 which conjointly receive a gravity-actuated shutter, which is designated as a whole by the reference letter A. This shutter includes a frame which consists of spaced side members 22—22 and upper and lower transverse members 23 and 24 respectively. The inner edges of the longitudinal members 22 are respectively formed with longitudinal grooves 22ª for conjointly receiving upper and lower ruby plate sections 25 and 26, the latter being immovably supported by the lower transverse member 24. The upper transverse member 23 is formed on its rear face with a centrally arranged vertical groove 27. A hook rod 28 has its shank disposed within the groove 27, and has its lower end formed with a hook 29 which engages in an opening 30 centrally formed in the upper portion of the upper ruby section 25, the upper end of the hook rod being formed with an eye 31. A hook bolt 32 has its shank arranged within an opening 33 formed in the back-board 23 and registering with the groove 27 thereof, the bill 34 of said bolt embracing the hook rod 28. A winged nut 35 is associated with the front end of the hook bolt 32, and is adapted to clamp said hook rod 28 to the transverse member 23, and thereby hold the upper ruby section 25 in any adjusted position, thereby creating a light opening between the sections 25 and 26.

Connecting the guide bars 13 above the guide strips 16 is a transverse member 36 which is centrally formed with an opening 37 that registers with a similar opening 38 formed in the top strip 14. A standard 39 has its lower end reduced, as at 40, and fitted within the openings 37 and 38 above described. This standard extends vertically above the back-board, and supported upon the upper portion of this standard is a speed controlling means for the shutter A, and this means is designated as a whole by the reference letter B. This means includes a back plate 41 and a front plate 42 which are held in spaced relation by means of spacing rods 43. A shaft 44 is loosely mounted between these plates, and fixedly mounted on this shaft is a drum 45 and a gear wheel 46, the latter meshing with a pinion 47 fixed upon a shaft 48 which is also carried by said plates. Also fixed upon the shaft 48 is a gear wheel 49 which in turn meshes with a pinion 50 fixed upon a third shaft 51 also carried by said plates. This shaft extends forwardly of the front plate 42 and has a fan 52 detachably fitted thereon.

Secured to the upper portion of the back-board 7 on one side of the shutter A is a bracket 53. A balance lever 54 has one end 55 rebent and journaled in the bracket 53. This lever has its free end extending longitudinally of the back-board 7 and in advance of the shutter A. A cord 56 or other suitable flexible connection is trained around the drum 45, and has one end connected to the eye 31 of the hook rod 28 of the shutter A, and the other end fixedly connected to the free end of the balance lever 54. Stop collars 57 and 58 are respectively secured on the lever 54 at the inner and outer ends thereof.

In order to raise or lower the shutter A, there is provided a weight ball 59 which is eccentrically mounted for axial rotation upon the lever 54. A gripping element 60 is formed from a single length of wire and is bent to form opposed loops 61—61 for engagement with the lever 54 on opposite sides of the ball 59. The wire intermediate the loops is twisted together. In the normal position of the ball 59, the heavier portion thereof is disposed below the lever 54, but when it is desired to secure the ball 59 to any point along the lever 54, said ball is axially rotated by hand until the heavier portion thereof is caused to frictionally bear against the gripping element 60, thereby causing said element to be forced outwardly to clamp the wire and ball to the lever, yet permitting the ball to be easily shifted along the lever previous to each movement of the shutter.

In the operation of my invention it will be apparent that when the shutter A is in its lowermost position, the bill of the hook 29 will engage the upper wall 62 of the printing cabinet, and thereby prevent said frame from being further lowered. When, however, the shutter A is in its uppermost position, stop pins 105 are engaged with the lower walls 63 of the printing cabinet, and thereby limit the upward movement of said shutter. In this position of the shutter, the balance lever 54 is inclined downwardly, as is clearly shown in Fig. 1 of the drawings. It will of course be understood that the upper ruby section 25 of the shutter has been previously adjusted to create an opening of sufficient size between the sections. In order to permit of the shutter A gravitating, the weight ball 59 is shifted along the lever to a position, such as shown in Fig. 1 of the drawings. The ball if too loose on the lever, is then axially rotated, so as to clamp the same to the lever, as above described. The weight of the shutter is sufficient in this position of the ball to elevate the lever 54 against the weight of said ball, and through the medium of the controlling means B. As the shutter thus descends, the light opening 12 will be gradually and uniformly covered by the shutter, and as a result, a uniform exposure will be imparted to the negative. The descent of the shutter is controlled by the slow speed gearing of the controlling means B together with the air fan 52, the weight ball 59 serving to actuate this controlling means. When the shutter has reached its lowermost position and a new printing paper has been applied the weight ball 59 is then shifted toward the free end of the balance lever 54, the ball serving to elevate the shutter A, as will be readily understood. Should the daylight be dim or the negative dense, a longer exposure will be necessary to effect the same result, and in order to compensate for such causes the upper section 25 of the shutter is elevated so as to form a larger opening between that section and the lower section 26. As a result, a longer time will be required for the opening between the sections to pass out of registration with the light opening 12.

When it is desired to dispense with the use of the apparatus the back board 7 may be swung upon its hinges 8 against the wall of the room.

Supported by the side walls 20 of the light tube 18 are upper and lower horizontal wires 18' and 19'. These wires are respectively disposed above and below the light opening 12 and are adapted for supporting vignettes or shades (not shown) of any suitable formation.

In the modified form of my invention as illustrated in Figs. 13 to 17 inclusive, there is shown a back-board 106 which is attached to a frame consisting of longitudinal members 107—107 and transverse members 108—108. The transverse members 108 are centrally connected by spaced intermediate longitudinal members 109—109, and the members 109 are connected adjacent their upper ends by a cross member 110. Centrally formed in the back-board 106 intermediate the members 109 is a light opening 111, and formed in the inner faces of the members 109 adjacent the opening 111 are vertical grooves 112 for receiving a ground glass plate 113. Above the groove 112, the inner faces of the members 109 are formed with larger grooves 114 for permitting the removal or insertion of the plate 113. Centrally formed in the upper transverse member 108 is a vertical opening 115 for receiving the lower end of a standard 116, the lower end of said standard being secured to the cross member 110 by means of a screw or other suitable fastening means.

Laterally projecting from the back board 106 around the light opening 111 in a direction opposite the above mentioned frame, is a light tube 116ª which is substantially similar in construction to the light tube 18 above described. Slidably mounted within suitable openings formed in the tube 116 is a shutter, which is designated as a whole by the reference numeral 117.

This shutter includes spaced side members 118—118 and an upper transverse member 119. The inner faces of the members 118 are formed with longitudinal grooves 120 for receiving upper and lower ruby plate sections 121 and 122, the upper section being fixedly mounted against the transverse member 119. The lower section 122 is adapted to be moved to or from the upper section 121 and retained in any adjusted position by means of transverse pins 123, which are adapted to be positioned within suitable openings formed in the members 118.

Secured to the upper side of the standards 116 is a casing 124, and a shaft 125 has its ends suitably journaled in the standard 116 and said casing. Loosely mounted on this shaft is a sprocket wheel 126, and over this wheel is trained a sprocket chain 127, one end thereof being suitably connected to an eye 128 which is centrally connected to the transverse member 119 of the shutter 117. A balance lever 129 is pivoted at one end, as at 130, to the back-board 106, and this lever extends longitudinally of the back-board and in advance of the shutter, and has its free end connected to the sprocket chain 127. The upper face of the lever is centrally formed with a series of transverse notches 130ª for receiving the ball 131 of a weight 132. Fixed upon the shaft 125 in rear of the sprocket wheel 126 is a ratchet wheel 133, the teeth thereof being engaged by a spring actuated pawl 134 which is carried by the ratchet wheel 126. It will thus be observed that when the chain 127 is moved in one direction, the pawl 134 will engage the ratchet wheel 133 to rotate the shaft 125. When, however, the movement of the chain 127 is reversed, the pawl 134 will slide over the teeth of the ratchet wheel 133, and as a result, the shaft 125 will not be affected. Also fixed on the shaft 125 in rear of the ratchet wheel 133 is an escape-wheel 135 and the rotation thereof and consequently the rotation of the shaft 125 is controlled by a pallet 136 which engages the teeth of said escape-wheel, said pallet being pivotally connected upon the upper end of a pendulum 137 which is centrally fulcrumed, as at 138, to the standard 116. The oscillation of the pendulum 137 is controlled by a weight 139 which is adjustably mounted along said pendulum and retained in any adjusted position by means of a set screw 140. Secured to the floor or to any other suitable support below the lever 129 is a treadle 141, and to this treadle is connected one end of a connection 142 such as a cord, the other end being connected to the lever 129 at a point intermediate its ends.

In the operation of this modified form, let it be supposed that the shutter 117 is elevated or in the position shown in Fig. 13 of the drawings. It will of course be understood that the printing cabinet has been positioned upon the light tube 116 and that a negative has been placed in its proper position. The weight 132 is adjusted along the balance lever 129 so as to offset the weight of the shutter 117. As a result, the shutter will lower itself by gravity. As the shutter thus gravitates, the sprocket chain 127 is caused to rotate the sprocket wheel 126, and the lever 129 will of course be elevated. As the sprocket wheel is loose on the shaft its rotation will cause the spring pawl 134 to rotate the ratchet wheel 133 and consequently the shaft 125. The speed, however, of this shaft is limited by the escape-wheel 135, pallet 136 and pendulum 137, and the movement of the pendulum is regulated by the weight 139, as will be readily understood. It will thus be observed that the speed of the shutter 117 during its descent may be easily regulated, and consequently the time of exposure for the negative may be varied at will. When it is desired to further regulate the time of exposure, the lower ruby plate section 122 may be elevated and consequently the opening between the sections 121 and 122 may be lessened or increased as desired. After the shutter has gravitated to its lowermost position, the balance lever 129 will be disposed in its elevated position. In order to return the shutter 117 to its normal or elevated position, the operator depresses the treadle 141, and as a result, the cord 142 will swing the lever 129 downwardly, and this lever, through the sprocket chain 127, will raise the shutter 117. It will thus be observed that the reverse movement of the chain 127 will cause the sprocket wheel 126 to rotate in a reverse direction, and as a result, the pawl 134 will slide over the teeth of the ratchet wheel 133 without affecting the shaft 125.

What is claimed is:

1. In a photographic apparatus, a shutter, a device for controlling the movements of the shutter including a vertically swinging balance lever, and connections between the shutter and lever.

2. In a photographic apparatus, a device for controlling the movements of the shutter including a vertically swinging balance lever, a weight ball eccentrically mounted upon the lever, and a gripping element carried by the lever and adapted to be engaged by the ball to hold the latter in adjusted position.

3. In a photographic apparatus, a shutter, a device for collecting the movements of the shutter including a vertically swinging balance lever, connections between the lever and shutter, a weight ball eccentrically mounted upon the lever, and a gripping element carried by the lever and adapted to be engaged by the ball to lock the latter in an adjusted position on said lever, said element being formed from a single length of wire arranged over the ball and having its end portions bent around the lever on either side of the ball.

4. In a photographic apparatus, the combination with a back-board having a light opening formed therein, of a shutter movable over said opening, and means including a balance lever for controlling the descent of said shutter.

5. In a photographic apparatus, the combination with a back-board having a light opening formed therein, of a shutter movable over said opening, a drum supported by the back-board above the shutter, a balance lever pivotally mounted at one end upon the back-board for vertical swinging movements, a flexible connection trained over the drum and having one end connected to the shutter and the other end connected to the lever, and a weight mounted on the lever for controlling the descent of the shutter.

6. In a photographic apparatus, the combination with a back-board having a light opening formed therein, of a shutter movable over said opening, a standard extending upwardly from the back-board, a drum supported for rotation upon the standard, a fan, a slow speed gear connecting the drum and fan, a balance lever pivotally mounted at one end upon the back-board for vertical swinging movements, a flexible connection trained over the drum and having one end connected to the shutter and the other end connected to the lever, and a weight mounted on the lever for controlling the descent of the shutter.

7. In a photographic apparatus, the combination with a back-board having a light opening formed therein, of a shutter movable over said opening, and means including a balance lever and a weight adjustably mounted thereon for controlling the descent and ascent of said shutter.

8. In a photographic apparatus, the combination with a back-board having a light opening formed therein, of a shutter movable over said opening, a drum supported by the back-board above the shutter, a balance lever pivotally mounted at one end upon the back-board for vertical swinging movements, a flexible connection trained over the drum and having one end connected to the shutter and the other end connected to the lever, and a weight adjustably mounted on the lever for controlling in one position the descent of the shutter and in another position for controlling the ascent of said shutter.

9. In a photographic apparatus, the combination with a back-board having a light opening formed therein, of a shutter movable over said opening, a drum supported by the back-board above the shutter, a balance lever pivotally mounted at one end upon the back-board for vertical swinging movements, a flexible connection trained over the drum and having one end connected to the shutter and the other end connected to the lever, a weight ball eccentrically mounted upon the lever for movements therealong for controlling in one position the descent of the shutter and in another position for controlling the ascent of said shutter, and a gripping element carried by the lever and adapted to be engaged by the ball to hold the latter in an adjusted position on said lever.

10. In a photographic apparatus, a shutter comprising in combination, a frame including spaced side members and end members, the side members having their inner edges formed with longitudinal grooves, upper and lower plate sections mounted in the grooves of said members, the lower section resting upon the lower transverse member of the frame and the upper section being mounted for longitudinal movements in the frame, a rod connected to the upper section, and means carried by the upper end member of the frame for engagement with the rod to lock the upper section in any adjusted position with respect to the lower section.

11. In a photographic apparatus, a shutter comprising in combination, a frame including an end member, a plate section slidably mounted in the frame, the inner face of the end member being centrally formed with a transverse groove, a rod disposed within the groove and having its inner end formed with a hook engageable with the section, a hook-bolt carried by the end member and engaging the rod, and a nut engageable with the hook-bolt for clamping the rod to the member to lock the section in an adjusted position along the frame.

12. In a photographic apparatus, a device for controlling the movements of a gravity shutter including a vertically swinging balance lever, and a weight mounted on the lever.

13. In a photographic apparatus, a device for controlling the movements of a gravity shutter including a vertically swinging balance lever, a weight ball eccentrically mounted upon the lever, and a gripping element carried by the lever and adapted to be engaged by the ball to hold the latter in an adjusted position on said lever.

14. In a photographic apparatus, a device for controlling the movements of a gravity shutter including a vertically swinging balance lever, a weight ball eccentrically mounted upon the lever, and a gripping element carried by the lever and adapted to be engaged by the ball to lock the latter in an adjusted position on said lever, said element being formed from a single length of wire arranged over the ball and having its end portions bent around the lever on either side of the ball.

15. In a photographic apparatus, the combination with a back-board having a light opening formed therein, of a light tube extending inwardly from the back-board around said opening, a shutter for controlling the opening movable through the tube, means for controlling the descent of said shutter, and means carried by the shutter for engagement with the tube to limit the downward movement of said shutter.

16. In a photographic apparatus, the combination with a back-board having a light opening formed therein, of a light tube extending inwardly from the back-board around said opening, a shutter for controlling the opening movable through the tube, said shutter comprising a frame, upper and lower plate sections carried by said frame, one of said sections being fixed and the other mounted for longitudinal movement along the frame, means for retaining the movable section in a predetermined position with respect to the fixed section, and means for controlling the descent of said shutter.

17. In a photographic apparatus, the combination with a back-board having a light opening formed therein, of a light tube extending inwardly from the back-board around said opening, a shutter for controlling the opening movable through the tube, a drum supported by the back-board above the shutter, a balance lever pivotally mounted at one end upon the back-board for vertical swinging movements, a flexible connection trained over the drum and having one end connected to the shutter and the other end connected to the lever, and a weight mounted on the lever for controlling the descent of the shutter.

18. In a photographic apparatus, the combination with a back-board having a light opening formed therein, of a light tube extending inwardly from the back-board around said opening, a shutter for controlling the opening movable through the tube, means for controlling the descent and ascent of said shutter, and means carried by the shutter for alternately engaging the tube to respectively limit the descent and ascent of said shutter.

In testimony whereof, I affix my signature, in presence of two witnesses.

JOHN J. UNBEHAUN.

Witnesses:
H. J. STRUVE,
WM. STRUVE.